Oct. 17, 1961   J. W. KING, JR   3,004,591
ADJUSTABLE AWNING
Filed Feb. 18, 1958   5 Sheets-Sheet 1
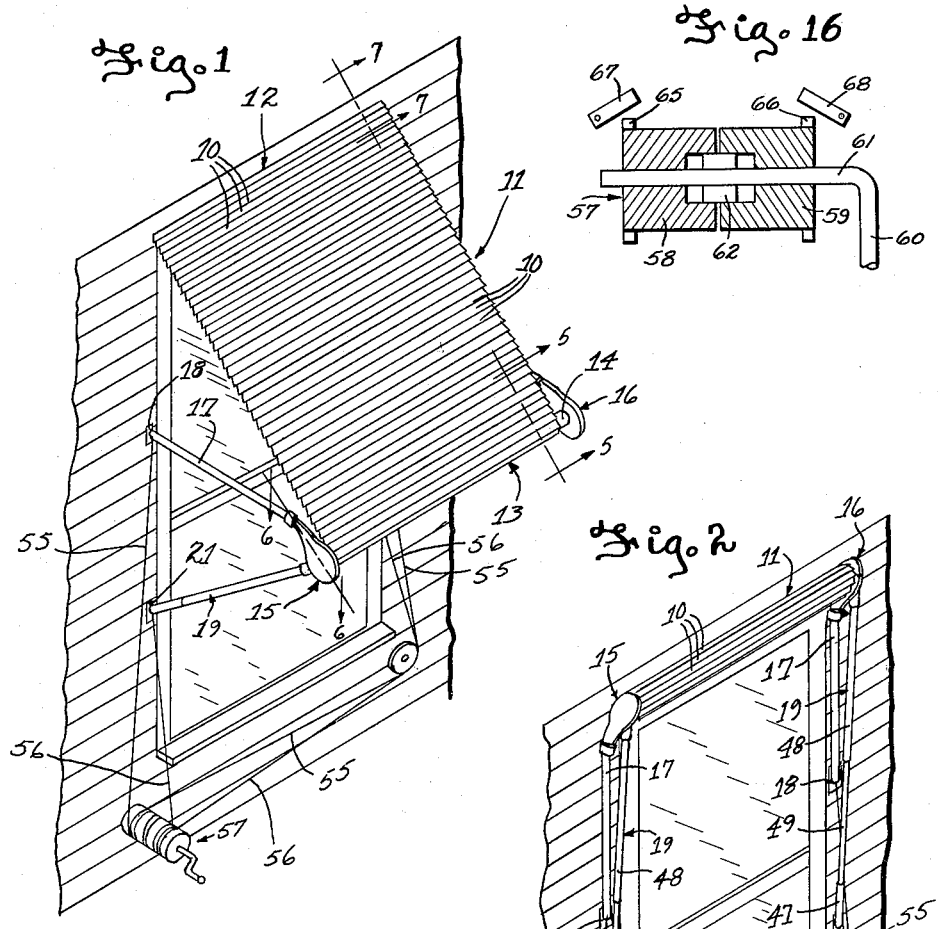
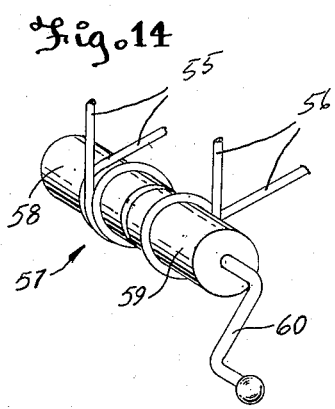
INVENTOR.
Jonathan W. King Jr.
BY
Michael Williams
Attorney

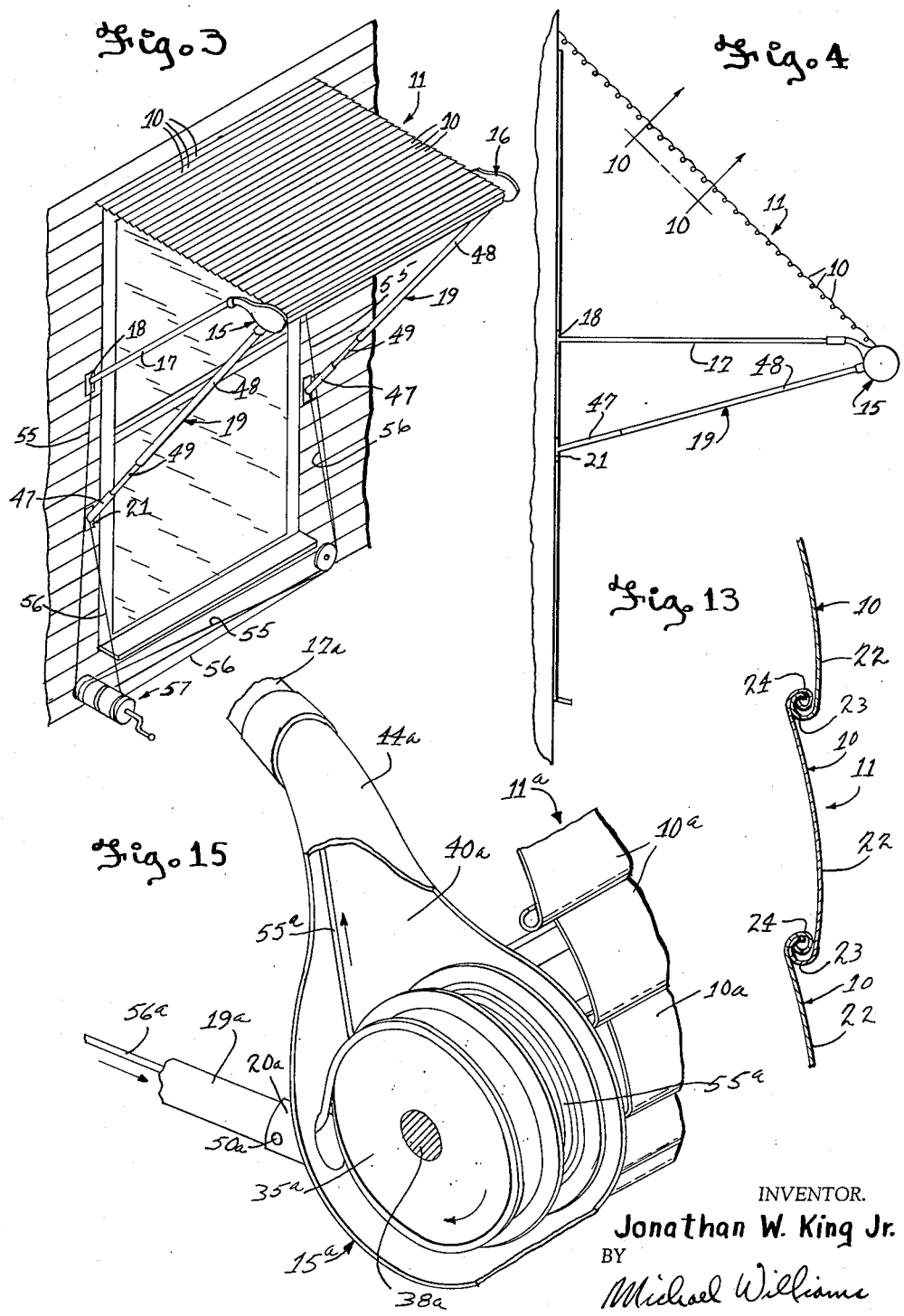

Oct. 17, 1961  J. W. KING, JR  3,004,591
ADJUSTABLE AWNING
Filed Feb. 18, 1958  5 Sheets-Sheet 3
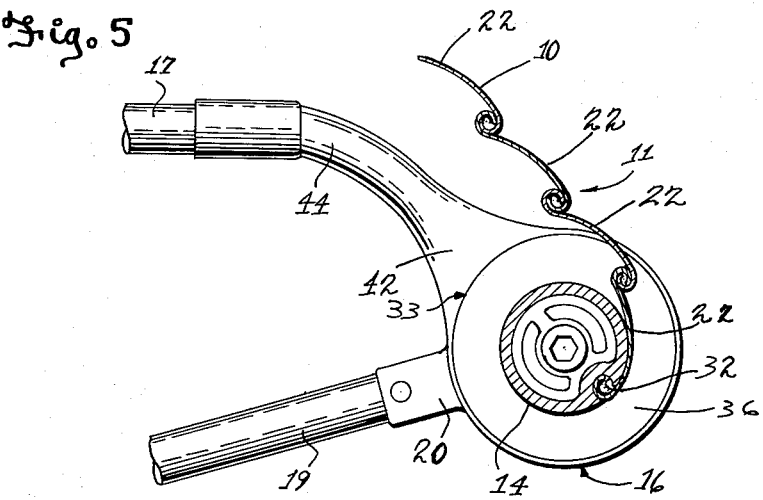
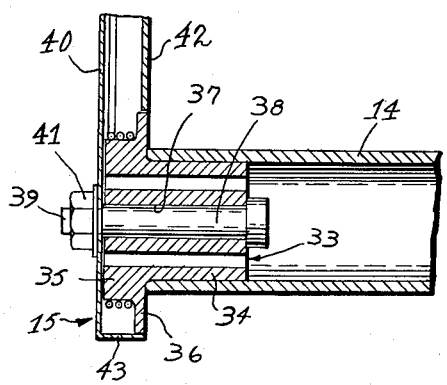
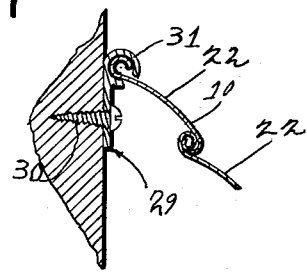
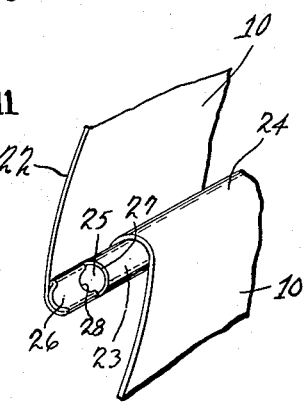
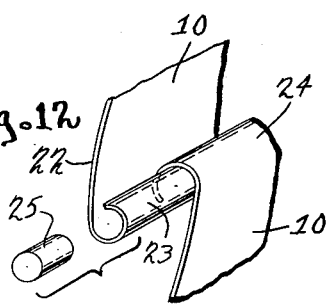
INVENTOR.
Jonathan W. King Jr.
BY
Michael Williams
ATTorney

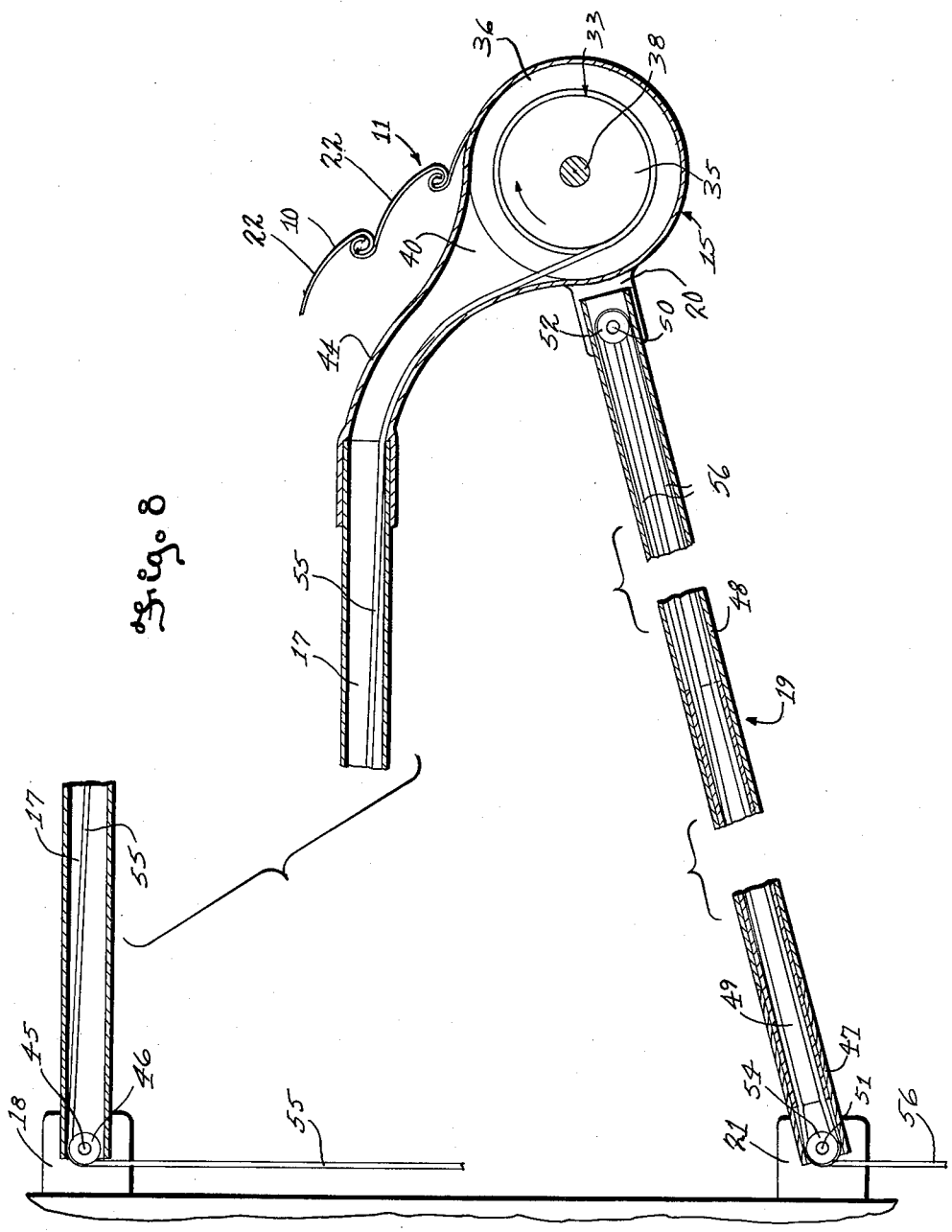

Oct. 17, 1961  J. W. KING, JR  3,004,591
ADJUSTABLE AWNING
Filed Feb. 18, 1958  5 Sheets-Sheet 5
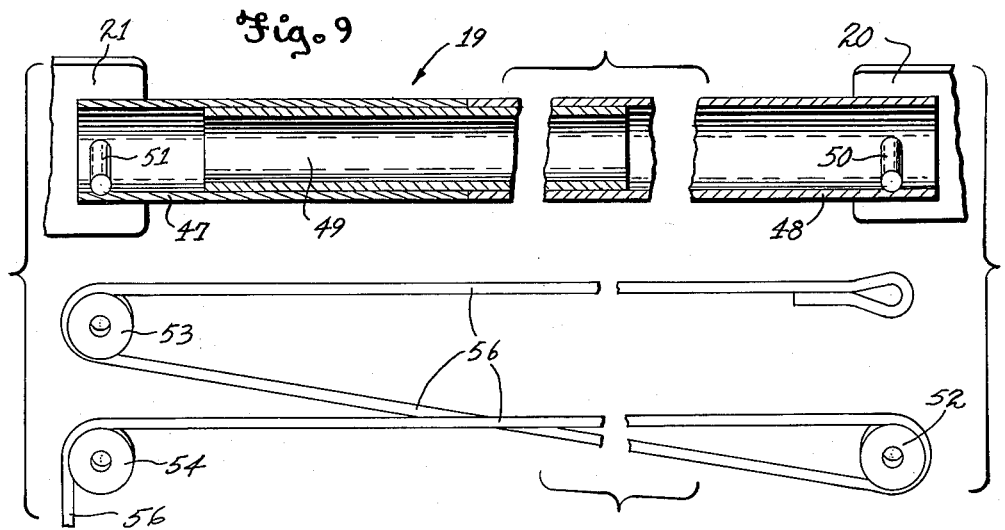
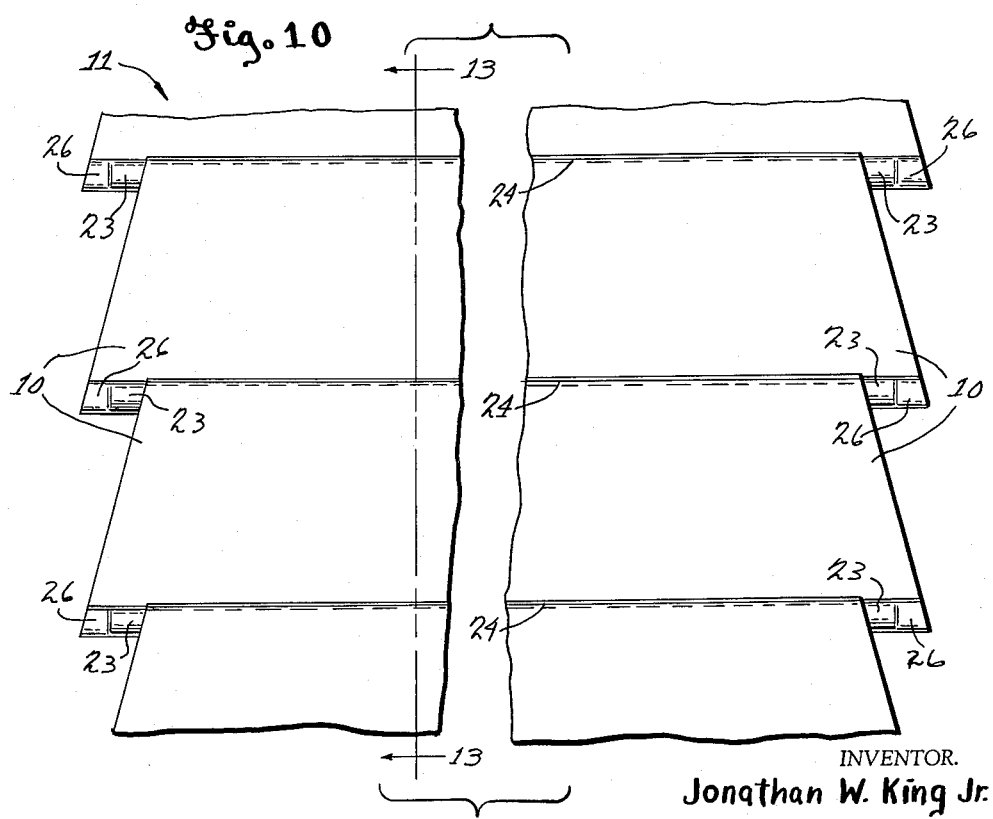
INVENTOR.
Jonathan W. King Jr.
BY
Michael Williams
Attorney

United States Patent Office 3,004,591
Patented Oct. 17, 1961

3,004,591
ADJUSTABLE AWNING
Jonathan W. King, Jr., 417 Warren Ave., Niles, Ohio
Filed Feb. 18, 1958, Ser. No. 715,881
14 Claims. (Cl. 160—62)

The present invention relates to awnings, more particularly to metal awnings of the adjustable type, and the principal object of the invention is to provide new and improved awnings of such character.

While many types of adjustable metal awnings have been designed and sold, most have possessed one or more serious drawbacks which limited wider acceptance. One of the drawbacks of certain prior art metal awnings has been their exceedingly high cost which is the result of their complex design. Furthermore, despite their high initial cost, many of these prior art awnings had a relatively short life because of inherent weakness at certain places. By way of illustration and in certain awnings of the roll-up type, one or more cords were wound up with the awning panel. In view of the fact that the awning panels are made up of relatively thin metal slats, the latter were frequently deformed by the cords, and thus the necessary pivotal action between respective slats was impaired. Additionally, the manner frequently employed in holding the individual slats of a roll-up awning panel against relative longitudinal movement also greatly impaired their pivotal movement.

Many prior art metal awning constructions have met with consumer resistance because of their bulky appearance, particularly when partially or completely raised from their extended position. Others have met with little commercial success because of their lack of rigidity, especially at positions intermediate their collapsed and extended positions.

The present awning and its method of construction provide an awning structure which is pleasing to the eye at all positions of adjustment, which may be rigidly locked in place at all positions of adjustment, which is relatively simple and low in cost of manufacture and which is extremely rugged for long, trouble free service. These and other advantages will readily become apparent from a study of the following description and from the drawings appended hereto.

In the drawings accompanying this specification and forming a part of this application there is shown, for purposes of illustration, embodiments which the invention may assume, and in these drawings:

FIGURE 1 is a perspective view of a preferred embodiment of the invention attached to a house or the like and in extended position to provide maximum shading for a window, FIGURE 2 is a view similar to FIGURE 1 but showing the awning of the present invention in fully retracted position wherein no shading of the window takes place, FIGURE 3 is a view similar to FIGURES 1 and 2 but showing the awning at a position intermediate the positions shown in FIGURES 1 and 2, FIGURE 4 is a side elevational view of the awning as seen in the position shown in FIGURE 1, FIGURE 5 is an enlarged fragmentary sectional view generally corresponding to the line 5—5 of FIGURE 1, FIGURE 6 is an enlarged, fragmentary sectional view generally corresponding to the line 6—6 of FIGURE 1, FIGURE 7 is an enlarged, fragmentary sectional view generally corresponding to the line 7—7 of FIGURE 1, FIGURE 8 is an enlarged, fragmentary, broken elevational view, similar to FIGURE 4 but with certain parts on the near side broken away to illustrate the internal construction, FIGURE 9 is a further enlarged, exploded, fragmentary, broken perspective view of a detail, FIGURE 10 is an elevational view looking in the direction indicated by the line 10—10 of FIGURE 4, FIGURE 11 is an enlarged fragmentary perspective view of a detail, FIGURE 12 is an exploded view, similar to FIGURE 11, but illustrating the parts prior to final assembly, FIGURE 13 is a fragmentary sectional view generally corresponding to the line 13—13 of FIGURE 10, FIGURE 14 is an enlarged perspective view of a detail shown in FIGURES 1, 2 and 3, FIGURE 15 is an enlarged, fragmentary, broken perspective view of another embodiment of the invention, and FIGURE 16 is a diagrammatic sectional view of the detail fragmentarily seen in FIGURE 14.

Briefly, and as best seen in FIGURES 1 and 4, the present invention comprises an awning formed of a plurality of metal slats 10 pivotally secured together in side-by-side relation to provide a flexible panel 11. One end 12 of the panel 11 is adapted to be pivotally secured to a supporting structure, usually above a window or the like which is to be shaded, and the other end 13 of the panel is adapted to be secured to a rotatably mounted spindle 14.

Respective ends of spindle 14 extend beyond the side margins of the awning panel and such ends are rotatably carried by housing 15, 16. Each housing 15, 16 is pivotally secured to the supporting structure by means of a hollow arm 17 whose one end is affixed to respective housings and whose other end is pivotally secured to the supporting structure by means of respective brackets 18. For a purpose to be disclosed, hollow, telescoping knee braces 19 have one end pivotally secured to lugs 20 carried by respective housings 15, 16 and such knee braces have their other end pivotally secured to the supporting structure by means of brackets 21 which are disposed in spaced relation with the aforesaid brackets 18. As will later be disclosed, various cables extend through respective arms 17 and knee braces 19 to effect extension and retraction of the awning structure and also effect locking thereof in any desired position within its range of movement.

Turning now to a more detailed disclosure of the awning panel 11 and referring to FIGURES 1, 5, 10 and 13, it will be seen that the awning slats 10 are herein disclosed as being relatively narrow and of a length to span the window to be shaded. All of the awning slats are preferably identical and each is preferably curved in transverse profile to present a convex outer face 22 which materially improves the appearance of the awning, adds strength to the individual slats, and facilitates winding the panel upon spindle 14 as will appear.

As previously mentioned, the side margins of respective adjoining awning slats 10 are pivotally secured together and in the position of parts shown, the lower margin of each is preferably rolled away from the outer face 22 of the slat to provide a hollow bead 23 and the upper margin of each is preferably rolled toward the outer face of the slat to provide a pintle 24 which slidably fits within the bead of an adjoining slat. This construction, as will be apparent, provides an awning panel which, although formed by relatively inflexible metal slats, is nevertheless quite flexible since adjoining slat margins are pivotally secured together.

As best seen in FIGURE 10, respective ends of each slat are cut at an angle instead of being cut square so that the lower margin of each slat, which provides bead 23, is of a greater length than its upper margin, which provides pintle 24. This not only provides serrated side margins on the awning panel which greatly improve its appearance but also provides a highly desirable function as will hereinafter appear.

Still referring to FIGURE 10, the awning slats are arranged so that end portions of each bead 23 project beyond the respective end portions of the pintle 24 of a respective adjoining slat and each bead end portion is closed to prevent escape of the pintle 24 disposed therein. As will appear, the closing of the bead end portions restricts relative movement of adjoining slats longitudinally of each other and therefore maintains the slats in assembled relation.

The means presently employed to close the ends of the beads 23 comprises a plug 25 (see FIGURE 11) disposed within respective bead ends in abutting relation with respective ends of pintle 24 and locked in position within the bead in any suitable manner. As herein disclosed, each plug 25 is of a length less than the length of that bead end portion which projects beyond respective pintle ends and each is adapted to be inserted within its bead end, as illustrated in FIGURE 12, until it abuts the adjoining end of the pintle. The extreme end of the bead is then deformed as seen at 26 in FIGURE 11 to prevent escape of the plug 25. Note that in deforming the bead, the latter is preferably partially severed at 27 to provide an abutment 28, outboard of the plug against which the latter seats. This then securely locks adjoining slat together without imparting their relative pivotal movement.

As best seen in FIGURE 7, an elongated bracket 29, preferably of a length about equal to that of an awning slat bead, is secured to the supporting structure above the window to be shaded by means of screws 30. Bracket 29 is provided with a hollow bead 31 in which the pintle portion 24 of the uppermost awning slat 10 is pivotably receivable to pivotally secure the uppermost end 12 of the awning panel to the supporting structure. Although not shown, any suitable means may be employed to retain the pintle providing margin of the uppermost slat against substantial movement relative to this bracket in a direction longitudinally thereof.

With reference now to FIGURE 5, the previously mentioned spindle 14 is preferably hollow and is provided with a longitudinally extending lipped groove 32 for slideably receiving the bead 23 of the lowermost awning slat 10. This bead fits within lipped groove 32 in generally the same manner as the previously mentioned pintle margins of the slats fit within the beads 23 of respective adjoining slats. Note that since the mouth of lipped groove 32 is smaller than the main portion of the groove, the slat bead will be pivotally retained there within to thus secure the lowermost end 13 of the awning panel to the spindle.

Spindle 14 is of a length slightly longer than the width of the awning panel and is provided at each end with a flanged pulley 33 (see FIGURE 6). Each pulley 33 has a shank portion 34 which fits within respective ends of the hollow spindle and the latter is press fitted or otherwise suitably secured to respective pulleys. For a purpose to be seen, each pulley has a drum portion 35 and a flange portion 36.

Each pulley 33 (see FIGURE 6) has a central bore 37 which is concentric with spindle 14 and slidably fitting within such bores are the shank portions of respective shoulder screws 38. The reduced diameter threaded portion 39 of each shoulder screw passes through an aperture in the outer wall 40 of respective housings 15, 16 and a suitable nut 41 draws the shoulder of each screw against its respective housing to thus secure the screws thereto and to rotatably secure the pulleys and therefore the spindle to respective housings.

Housings 15, 16 are similar, although of opposite hand, and each has the aforesaid outer wall 40, an inner wall 42 and a connecting, generally annular wall 43. As best seen in FIGURE 6, each inner wall 42 is apertured to pass the flanges 36 of respective pulleys 33. As best seen in FIGURE 5 but as may also be seen in FIGURES 1 through 4, each housing 15, 16 has a gooseneck portion 44 to which is affixed one end of respective previously mentioned hollow arms 17. The other ends of arms 17 are pivotally secured to respective brackets 18 by means of respective pivot pins 45 (see FIGURE 8). For a purpose to be seen, each pivot pin 45 rotatably carries a pulley 46 preferably of a size to fit within respective arms.

Still referring to FIGURE 8 but as also shown in the exploded view FIGURE 9, the previously mentioned knee braces 19 are formed of a pair of tubular members 47, 48 in end-to-end relation. Suitably secured within one of such members is a tubular extension 49 which slidably fits within the other member to thereby provide a telescoping assembly for a purpose to be seen. Knee braces 19 extend between respective housings 15, 16 and the supporting structure and one end of each knee brace is pivotally secured to respective housing lugs 20 by means of a pivot pin 50 and the other end of each knee brace is pivotally secured to respective brackets 21 by means of a pivot pin 51. For reasons to be disclosed, pivot pin 50 rotatably carries a pulley 52 while pivot pin 51 rotatably carries a pair of pulleys 53, 54.

As best seen in FIGURES 6 and 8, a cable 55 is wound upon drum 35 provided by respective pulleys 33 carried by spindle 14 and each cable extends through its arm 17 and over pulley 46. After passing over pulleys 46, cables 55 may be brought together in any suitable manner so that they may be pulled simultaneously.

As best seen in FIGURES 8 and 9, a cable 56 is carried by each of the knee braces 19 and for a purpose to be disclosed, each cable 56 has one end anchored to a respectively pivot pin 50 and each extends through its knee brace and about a respective pulley 53 carried by a respective pin 51. From pulley 53, each cable passes about a respective pulley 52 and thence about a respective pulley 54 to thus provide three reaches of cable within each knee brace. After passing about respective pulleys 54, respective cables 56 may be brought together in any suitable manner so that they may be pulled simultaneously.

With the awning in the extended position shown in FIGURES 1, 8 and 9, it will be seen that a considerable length of each of the cables 55 is wound upon respective drum 35. On the other hand, since the telescoping knee braces 19 are collapsed, each contains a minimum length of respective cables 56.

If a pull in the direction of the arrow in FIGURE 8 is now exerted upon cables 55, they will be unwound from their respective drums and effect rotation thereof in the direction of the arrow and consequent rotation of spindle 14. Rotation of spindle 14 in the direction of the arrow will wind the awning panel 11 thereon and will cause the spindle to swing bodily in an arc about the arm pivots 45 toward the retracted position shown in FIGURE 2. As spindle 14 swings upwardly, it will be apparent that the knee braces 19 will be carried therewith and, since knee brace brackets 21 are spaced beneath arm brackets 18, the knee braces will telescope outwardly and pull an additional length of respective cables 56 into respective knee braces.

For reasons later to appear, it is desirable to equalize the amount of cable 55 pulled from drums 35 with the amount of cable 56 pulled into knee braces 19 as the awning structure is moved from its extended position shown in FIGURE 1 to its retracted position shown in FIGURE 2. It is for this reason that each cable 56 is disposed in respective knee braces 19 in three reaches. Accordingly, with the parts proportioned as herein shown, approximately three feet of cable will be drawn from drums 35 in effecting movement of the awning structure from extended to collapsed relation. During such movement, knee braces 19 will telescope outwardly about one foot and since cables 56 are disposed within respective knee braces in three reaches, approximately three feet of cable will be pulled into each knee brace.

When the awning is to be lowered from its retracted position shown in FIGURE 2, a pull will be exerted upon cables 56. This as will be apparent, will cause the spindle 14 to swing downwardly about the arm pivots and such downward movement will unwind the awning panel therefrom and effect rotation of the spindle in the opposite direction from that of the arrow in FIGURE 8 to thus wind up respective cables 55 on respective drums 35 once again.

It is an important feature of the present invention that the awning structure may be rigidly held in any position intermediate the extreme positions seen in FIGURES 1 and 2. That this is a feature of considerable importance is evidenced by the fact that prior art extensible-retractable awnings must be retracted during high winds to prevent their being torn loose or otherwise damaged whereas the present awning will be no more affected by high winds than would be a fixed awning.

To position the awning in an intermediate position and assuming it is disposed in extended relation as seen in FIGURE 1, the cables 55 will be pulled as before described to raise the awning to, for example, the intermediate position illustrated in FIGURE 3. Cables 56 will then be tied about a suitable cleat (not shown) or otherwise secured against movement into the knee braces. Cables 55 will once again be pulled; however, since the now secured cables 56 prevent further extension of the knee braces, upward swinging movement of the spindle will be arrested and the pull on cables 55 will only have the effect of tensioning cables 56, the awning panel and cables 55. When the parts aforesaid have been sufficiently tensioned, cables 55 will also be tied about a suitable cleat (not shown) or otherwise secured against reverse movement to maintain the tension thereon. At this time, since all of the cables together with the awning panel are taut, the awning structure will be securely held in position.

Although in the interest or simplicity the hereinabove disclosed cables have been described as being operated by merely grasping them by hand and exerting a pull as described, it is preferable to provide a windlass device 57 (see FIGURES 1, 2, 3 and 14) upon which the cables are wound. As herein disclosed, the windlass device comprises a drum formed of drum segments 58, 59 which are selectively rotatable both together and separately about the axis of a crank 60. As herein disclosed, the pair of cables 55 are secured together to drum segment 58 while the pair of cables 56 are secured together to drum segment 59. Note that the respective cable pairs are wound upon respective drum segments in opposite directions so that rotation of both drums in the direction indicated by the arrow will wind cables 55 thereon and unwind cables 56 therefrom to thus retract the awning.

Any suitable means may be provided to effectuate either simultaneous rotation of the windlass drum segments 58, 59 or individual rotation thereof and as schematically seen in FIGURE 16, the drums are journaled upon rectilinear portion 61 of crank 60 in adjoining, end-to-end relation. Although not shown, the crank 60 will be journaled in a suitable frame for axial as well as rotative movement and such frame will restrain the drums against axial movement. An intermediate portion of the crank portion 61 carries a transversely projecting plate 62 which closely fits within axially elongated slots 63, 64 formed in the abutting ends of respective drums 58, 59. The outer end of each drum 58, 59 may be formed with a respective ring of teeth 65, 66 and shiftably carried by the frame aforesaid (but not illustrated) are respective dogs 67, 68 which are selectively pivotable to engagement with respective drum teeth.

With the parts disposed as seen in FIGURE 16, rotation of crank 60 will simultaneously rotate drums 58, 59 since neither of the dogs 67, 68 are engaged with their teeth and since plate 62 spans both drums and has driving engagement with defining margins of respective drum slots 63, 64. If now, for example, it is desired to rotate drum 58 while restraining drum 59 against rotation, dog 68 will be pivoted to engagement with drum teeth 66 thus locking drum 59, and also drum 58 at this time, against rotation. If crank 60 is now shifted to the left, in the position of parts viewed, to position plate 62 wholly within the drum slot 63, rotation of the drum 59 alone will be effectuated by turning the crank. Obviously, rotation of drum 59 while holding drum 58 against rotation can be effectuated by disengaging dog 68, engaging dog 67, and shifting crank 60 to the right to wholly dispose plate 62 in drum slot 64 prior to crank rotation.

The embodiment of the invention fragmentarily illustrated in FIGURE 15 is similar to that theretofore disclosed; accordingly, similar parts are identified with the same reference characters but with the suffix "a" added. The embodiment seen in FIGURE 15 differs from the foregoing embodiment primarily in the matter in which cables 56a are arranged. In this embodiment, each drum 35a is enlarged to provide axially spaced portions upon one of which is wound a respective cable 55a, as before disclosed, and upon the other of which is wound a respective cable 56a. For a purpose to appear, cables 55a and 56a are wound upon respective drum portions in opposite directions. Moreover, in this embodiment, cables 56a preferably extend straight through respective knee braces 19a instead of being disposed therein in a plurality of reaches.

Operation of the embodiment seen in FIGURE 15 will be as follows: Assuming the awning structure to be extended as seen in FIGURE 1, a pull in the direction of the arrow will be exerted upon the cables 55a to cause retraction of the awning. This will unwind cables 55a from respective drums 35a and cause rotation thereof in the direction of the arrow and rotation of the attached spindle and therefore cause the awning panel to be wound upon the spindle as previously disclosed with respect to the prior described embodiment. It will be noted that as cables 55a unwind from drums 35a and thus effect their rotation, such rotation of the drums will cause respective cables 56a to be wound thereon so long as movement of these latter cables is not prevented as hereinabove described. When movement of cables 56a is prevented as by securing them to a cleat or by locking the appropriate drum on the windlass, the pull on cables 55a will cause the cables and the awning panel to become taut to thus make rigid the awning assembly.

In view of the foregoing it will be apparent to those skilled in the art that I have accomplished at least the principal object of my invention and it will also be apparent to those skilled in the art that the embodiments herein described may be variously changed and modified, without departing from the spirit of the invention, and that the invention is capable of uses and has advantages not herein specifically described, hence it will be appreciated that the herein disclosed embodiments are illustrative only, and that my invention is not limited thereto.

I claim:

1. A roll-up awning comprising a pair of awning slats in side-by-side relation with a margin of one adjacent a margin of the other and said margin of one providing a marginally extending bead and said margin of the other providing a marginally extending pintle fitting within said bead to pivotally secure said slats together, the bead providing margin of said one slat being greater in length than the pintle providing margin of said other slat to provide said bead providing margin of said one slat with end portions which extend longitudinally beyond respective end portions of the pintle providing margins of said other slat, and plug means disposed within respective tubular bead end portions and secured therein by inward deformation of respective adjoining bead portions, respective plug means providing spaced abutments within said bead which engage respective ends of said pintle to confine the latter therebetween and thus restrict relative movement of said slats longitudinally of said margins.

2. A roll-up awning comprising a pair of awning slats in side-by-side relation with a margin of one adjacent a margin of the other and said margin of one providing a marginally extending bead and said margin of the other providing a marginally extending pintle fitting within said bead to pivotally secure said slats together, the bead providing margin of said one slat being greater in length than the pintle providing margin of said other slat to provide said bead providing margin of said one slat with end portions which extend longitudinally beyond respective end portions of the pintle providing margins of said other slat, respective end portions of said bead providing margin being cut transversely to divide such respective end portions into an outermost bead end part and an innermost bead end part and said outermost bead end parts adjacent respective cuts being deformed radially inwardly of said bead whereby defining margins of respective cuts provide facing abutments, and plug means disposed within respective innermost bead end parts and secured therein by engagement with respective abutments provided by said defining margins of respective cuts, respective plug means providing spaced abutments within said bead which engage respective ends of said pintle to confine the latter therebetween and thus restrict relative movement of said slats longitudinally of said margins.

3. A roll-up awning comprising a plurality of awning slats in side-by-side relation pivotally secured together along adjoining margins to provide a flexible awning panel whose sides are defined by the ends of said slats, whose ends are defined by side margins of respective end slats, and whose one end is secured to a suitable support such as a wall and the like, spindle means having an intermediate portion connected to the other end of said awning panel and end portions projecting beyond respective sides thereof, a hollow arm on each side of said awning panel and each having one end pivotally mounted with respect to the support and in spaced relation with said awning panel end and each having its other end rotatably supporting respective spindle means end portions, and cable means having portions extending through respective arms and wound upon respective drums provided by respective spindle means end portions for effecting rotation of said spindle means to wind said awning panel thereon as said cable means portions are pulled tangentially from respective drums and to thereupon shift said spindle means bodily toward said one awning panel end in an arc about said pivotably mounted arm ends.

4. A roll-up awning comprising a plurality of awning slats in side-by-side relation pivotally secured together along adjoining margins to provide a flexible awning panel whose ends are defined by side margins of respective end slats and whose one end is secured to a suitable support such as a wall and the like, arm means having one end pivotally mounted with respect to the support and in spaced relation with said one awning panel end, spindle means connected to the other end of said awning panel and rotatably carried by the other end of said arm means for arcuate movement therewith toward and away from said one awning panel end, windless means rotatable in one direction to wind a cable thereon and rotatable in the opposite direction to unwind such cable therefrom, first cable means extending between said windless means and said spindle means and rotating the later, during winding of said cable means upon said windless means, in a direction to wind said awning panel thereon and such spindle means rotation exerting a force which swings the latter bodily about said arm means pivotal mounting in a direction toward said one awning panel end, and second cable means extending between said windlass means and said spindle means to effect movement of the latter in a direction away from said one awning panel end during winding of said second cable means upon said windlass means, said windlass means normally being operable to wind said first cable means thereon and simultaneously being operable to unwind said second cable means therefrom thus permitting unimpeded movement of said spindle means toward said one awning panel end to thereby retract said awning and said windlass means selectively being operable to wind one of said cable means thereon while maintaining the other against withdrawal therefrom to place that awning panel portion extending between said spindle means and said one awning end under tension to provide a rigid awning structure.

5. A roll-up awning comprising a plurality of awning slats in side-by-side relation pivotally secured together along adjoining margins to provide a flexible awning panel whose ends are defined by side margins of respective end slats and whose one end is secured to a suitable support such as a wall and the like, arm means having one end pivotally mounted with respect to the support and in spaced relation with said one awning panel end, spindle means connected to the other end of said awning panel and rotatably carried by the other end of said arm means for arcuate movement therewith toward and away from said one awning panel end, windlass means rotatable in one direction to wind a cable thereon and rotatable in the opposite direction to unwind such cable therefrom, first cable means extending between said windlass means and said spindle means and rotating the latter, during winding of said cable means upon said windlass means, in a direction to wind said awning panel thereon and such spindle means rotation exerting a force which swings said spindle means bodily about said arm means pivotal mounting in a direction toward said one awning panel end, and second cable means extending between said windlass means and said spindle means to effect movement of the latter in a direction away from said one awning panel end during winding of said second cable means upon said windlass means, said windlass means having a pair of drum portions upon which respective cable means are wound and normally providing for simultaneous rotation of said drum portions to wind said first cable means thereon and to unwind said second cable means therefrom thus permitting unimpeded movement of said spindle means toward said one awning panel end to thereby retract said awning, one of said drum portions selectively being rotatable while the other is held against rotation to wind up one of said cable means while preventing unwinding of the other to thereby place that awning panel portion extending between said spindle means and said one awning panel end under tension to provide a rigid awning structure.

6. A roll-up awning comprising a flexible awning panel whose one end is secured to a suitable support such as a wall and the like, spindle means having an intermediate portion connected to the other end of said awning panel and end portions projecting beyond respective sides thereof, a first hollow arm on each side of said awning panel and each having one end pivotally mounted with respect to the support and in spaced relation with said one awning panel end and each having its other end rotatably supporting respective spindle means end portions, first cable means having portions extending through respective first arms and wound upon respective drums provided by respective spindle means end portions for effecting rotation of said spindle means to wind said awning panel thereon as said cable means portions are pulled tangentially from respective drums and to thereupon shift said spindle means bodily toward said one awning panel end in an arc about said pivotably mounted first arm end, a second hollow telescoping arm on each side of said awning panel and each having one end pivotally connected to said other ends of respective first arms and each having its other end pivotally connected to the support in spaced relation with said one end of respective first arms, said second arms telescoping outwardly as said first arms are swung upwardly about their pivots and telescoping inwardly as said first arms are swung downwardly about their pivots, and second cable means having portions extending through respective second arms and selectively opposing the movement aforesaid of said spindle means toward said one awning panel end to place that awning panel portion extending between said spindle means and said one awning panel end under tension to provide a rigid awning structure.

7. A roll-up awning comprising a plurality of awning slats in side-by side relation pivotally secured together along adjoining margins to provide a flexible awning panel whose ends are defined by side margins of respective end slats and whose one end is secured to a suitable support such as a wall and the like, first arm means having one end pivotally mounted with respect to the support and in spaced relation with said one awning panel end, spindle means connected to the other end of said awning panel and rotatably carried by the other end of said arm means for arcuate movement therewith toward and away from said one awning panel end, second arm means with a variable effective length having one end pivotally mounted with respect to the support but in spaced relation to said first arm means one end and having its other end pivotally secured to said first arm means in spaced relation to the latter's one end and said second arm means changing its effective length during movement of said first arm means about its pivotal mounting, means for rotating said spindle means in a direction to wind said awning panel thereon and such spindle means rotation exerting a force which tends to swing said first arm means and said spindle means about said first arm means pivotal mounting in a direction toward said one awning panel end, and means for selectively preventing a change in length of said second arm means and consequently preventing pivotal movement of said first arm means during rotation of said spindle means in a direction to wind said awning panel thereon to thereby tension said awning panel and provide a generally rigid assembly unaffected by wind movement.

8. The construction of claim 6 wherein each first cable means portion is wound upon its drum in the same direction and wherein each second cable means portion is wound upon respective drums provided by respective spindle means end portions but in the opposite direction from that in which said first cable means portions are wound whereby rotation of said spindle means and consequent drum rotation in one direction winds said first cable means portions on their drums and unwinds said second cable means portions from their drums.

9. The construction of claim 6 wherein said second cable means portions are doubled back on each other within respective second arms to dispose a pair of cable reaches therein thus providing for force multiplication between movement of said second cable means and telescoping movement of said second arms.

10. The construction of claim 9 wherein opposite ends of one of said cable reaches is connected with respective ends of the second arm in which such cable reach is disposed.

11. A roll-up awning comprising arm means pivotally secured to a support such as a wall and the like and having a portion swingable in an arcuate path toward and away from the support, an awning panel having one end secured to the support in spaced relation to the arm means pivot and having its opposite end secured to and swingable with said arm means portion, roller means secured to one of the awning panel ends aforesaid and rotatable in one direction to wind said panel thereon and in the opposite direction to unwind said panel therefrom, means for selectively locking said roller means against rotation in said opposite direction, and means for selectively locking said arm means portion against movement in a direction toward said one awning panel end with the intermediate portion of said awning panel under tension to provide a rigid structure unaffected by high winds.

12. The construction of claim 11 wherein said roller means is carried by said arm means portion for movement therewith.

13. The construction of claim 11 wherein said means for selectively locking said roller means provides for rotation of the latter in said one direction to wind said awning panel thereon.

14. The construction of claim 13 wherein said means for selectively locking said roller means and providing for rotation of the latter comprises a cable wound upon a roller means portions.

References Cited in the file of this patent

UNITED STATES PATENTS

| | | |
|---|---|---|
| 677,123 | Ebner | June 25, 1901 |
| 695,240 | Sharps | Mar. 11, 1902 |
| 1,917,811 | Richardson | July 11, 1933 |
| 1,989,511 | Ginder | Jan. 29, 1935 |
| 2,099,408 | Packert et al. | Nov. 16, 1937 |
| 2,678,687 | Armstrong | May 18, 1954 |
| 2,760,459 | Kummerman | Aug. 28, 1956 |

FOREIGN PATENTS

| | | |
|---|---|---|
| 17,374 | France | June 5, 1913 |